US012760999B2

(12) United States Patent
Brown

(10) Patent No.: US 12,760,999 B2
(45) Date of Patent: Oct. 13, 2026

(54) AUTO-ILLUMINATING DRY FIRE TARGET

(71) Applicant: APEX IP HOLDINGS, LLC, Ogden, UT (US)

(72) Inventor: Roland Brown, Ogden, UT (US)

(73) Assignee: APEX IP HOLDINGS, LLC, Ogden, UT (US)

( * ) Notice: Subject to any disclaimer, the term of this patent is extended or adjusted under 35 U.S.C. 154(b) by 1199 days.

(21) Appl. No.: 17/735,946

(22) Filed: May 3, 2022

(65) Prior Publication Data

US 2022/0349678 A1 Nov. 3, 2022

Related U.S. Application Data

(60) Provisional application No. 63/183,507, filed on May 3, 2021.

(51) Int. Cl.
*F41G 3/26* (2006.01)
*G02B 27/12* (2006.01)

(52) U.S. Cl.
CPC ......... *F41G 3/2655* (2013.01); *G02B 27/126* (2013.01)

(58) Field of Classification Search
CPC ..... F41G 3/2655; G02B 27/126; F41A 33/02; F41J 5/02
USPC ......................................... 434/19, 20, 21, 22
See application file for complete search history.

(56) References Cited

U.S. PATENT DOCUMENTS

| | | | | |
|---|---|---|---|---|
| 3,655,192 | A * | 4/1972 | Hall | F41G 3/2683 200/34 |
| 4,051,729 | A * | 10/1977 | Thordarsson | G01L 13/02 73/716 |
| 5,072,910 | A * | 12/1991 | May | F16M 11/42 248/412 |
| 5,392,521 | A * | 2/1995 | Allen | G01C 15/02 359/833 |
| 5,512,219 | A * | 4/1996 | Rowland | B29C 33/424 264/225 |
| 2007/0268585 | A1* | 11/2007 | Santoro | F21S 11/00 359/599 |
| 2011/0043142 | A1* | 2/2011 | Travis | G02B 27/30 362/617 |
| 2013/0170223 | A1* | 7/2013 | Filoseta | G02B 5/0278 359/615 |
| 2015/0292708 | A1* | 10/2015 | Park | G02B 5/0263 362/327 |

* cited by examiner

*Primary Examiner* — Peter S Vasat
(74) *Attorney, Agent, or Firm* — David R. Conklin; Kirton McConkie

(57) ABSTRACT

A dry fire training apparatus includes a beam chamber, a beam splitter lens, and a beam diffuser element. The beam chamber has a receiving side, a reflecting side, and at least one sidewall extending therebetween. The beam splitter lens is coupled to the receiving side. The beam splitter lens is configured to receive a laser pulse having a first trajectory therethrough. The beam diffuser element is coupled to the reflecting side and/or the sidewall. The beam diffuser element is configured to diffuse the laser pulse around the beam chamber and reflect the laser pulse at a second trajectory to illuminate the beam splitter lens.

20 Claims, 6 Drawing Sheets

AUTO-ILLUMINATING DRY FIRE TARGET

RELATED APPLICATION

This application claims priority to U.S. Provisional Patent Application Ser. No. 63/183,507, filed May 3, 2021, which is incorporated herein by reference.

BACKGROUND

With over seventy-two million gun owners in America, effective firearm training is essential to allow gun owners to develop the skills needed to handle their weapons competently and safely. The popularity of dry fire training systems has grown tremendously in recent times. Such systems allow gun owners to improve their shooting skills at home without expending any ammunition.

Generally, targeting systems for dry fire training include mobile applications that must be calibrated and set up to electronic targets. Novice or casual users may not have the knowledge or ability to configure the system appropriately. The electronic targets typically flash and/or make a sound when struck by a laser beam to indicate a hit. In addition, known electronic targets tend to employ other various bells and whistles to justify a high price, but which fail to contribute to training value. Electronic targets also require batteries which must be replaced regularly to ensure proper system function.

The subject matter claimed herein is not limited to embodiments that solve any disadvantages or that operate only in environments such as those described above. Rather, this background is only provided to illustrate one example technology area where some implementations described herein may be practiced.

BRIEF SUMMARY OF THE INVENTION

The present disclosure relates generally to apparatuses, systems, and methods for dry fire training. Some embodiments as disclosed herein may provide a portable, cost-effective apparatus configured to brightly illuminate under most lighting conditions in response to a laser pulse strike. Importantly, in some embodiments, the apparatus may work without batteries or another power source.

In some embodiments, when the laser pulse strikes the apparatus, the laser may be distributed horizontally across a beam splitter lens and broken into hundreds of smaller beams, which may be reflected into a beam chamber. In some embodiments, the beams may strike a beam diffuser element within the chamber and be further broken down into smaller beams. In some embodiments, these smaller beams may be reflected back at random angles to the beam splitter lens. In this manner, in some embodiments, the incoming beam energy may be dissipated over the surface of the beam splitter lens to brightly illuminate the apparatus without requiring batteries or another power source.

In a first set of example embodiments, a dry fire training target apparatus may include a beam chamber having a receiving side, a reflecting side, and at least one sidewall extending therebetween. In some embodiments, a beam splitter lens may be coupled to the receiving side. In some embodiments, the beam splitter lens may be configured to receive at least a portion of a laser pulse therethrough. In some embodiments, the laser pulse may have a first trajectory.

In some embodiments, a beam diffuser element may be coupled to the reflecting side and/or the sidewall. In some embodiments, the beam diffuser element may be configured to diffuse the laser pulse around the beam chamber. In some embodiments, the beam diffuser element may reflect the laser pulse at a second trajectory to illuminate the beam splitter lens.

In some embodiments, the beam chamber may be made of a rigid material such as aluminum, aluminum alloy, steel, plastic, or a composite thereof. In some embodiments, the beam splitter lens may be a translucent and a transparent material. In some embodiments, the material of the beam splitter lens may include a bright color, such as red. In some embodiments, the beam splitter lens may include an array of beam splitting structures. In some embodiments, each of the array of beam splitting structures may include a pyramid shape. In some embodiments, the beam splitter lens may include a flat surface disposed opposite the array.

In some embodiments, the beam diffuser element may iteratively reflect the laser pulse at random angles to distribute the laser pulse across the flat surface. In some embodiments, the beam diffuser element may include a highly reflective material. In some embodiments, the highly reflective material may include an irregular texture.

In a second set of example embodiments, a dry fire training system may include a laser emitting element configured to couple to a firearm. In some embodiments, the laser emitting element may emit a laser pulse upon actuation of the firearm. In some embodiments, the dry fire training system may further include a target apparatus configured to illuminate in response to the laser pulse hitting at least a portion of the target apparatus.

In some embodiments, the target apparatus may include a beam chamber having a receiving side, a reflecting side, and at least one sidewall extending therebetween. In some embodiments, a beam splitter lens may be coupled to the receiving side and configured to receive at least a portion of a laser pulse therethrough. In some embodiments, the laser pulse may include a first trajectory. In some embodiments, a beam diffuser element may be coupled to the reflecting side and/or the sidewall. In some embodiments, the beam diffuser element may be configured to diffuse the laser pulse around the beam chamber and reflect the laser pulse at a second trajectory to illuminate the beam splitter lens.

In some embodiments, the system may include a template element configured to couple to the target apparatus. In some embodiments, the template element may selectively reduce an exposed area of the beam splitter lens. In some embodiments, the template element may be adjustable to at least one of enlarge and reduce the exposed area. In some embodiments, a template element is configured for use with a tracking software program.

Some embodiments of the system may include a stand element to support the target apparatus. In some embodiments, the stand element may be adjustable to selectively vary a height of the target apparatus.

In some embodiments, the beam splitter lens may include an array of beam splitting structures. In some embodiments, each of the array may include a pyramid shape. In some embodiments, the beam diffuser element may include a highly reflective material having an irregular texture.

In a third set of example embodiments, a method of making a target apparatus for dry fire training may include providing a beam chamber having a receiving side, a reflecting side, and at least one sidewall extending therebetween. In some embodiments, the method may include coupling to the receiving side a beam splitter lens. In some embodiments, the beam splitter lens may be configured to receive at least a portion of a laser pulse comprising a first trajectory.

In some embodiments, the method may further include coupling a beam diffuser element to an interior surface of the reflecting side and/or the sidewall. In some embodiments, the beam diffuser element may be configured to diffuse the laser pulse around an interior volume of the beam chamber. In some embodiments, the beam diffuser element may be configured to reflect the laser pulse at a second trajectory to illuminate the beam splitter lens.

In some embodiments, the method may include selectively coupling to the beam chamber a template element to reduce an exposed area of the beam splitter lens. In some embodiments, the method may include selectively coupling to the beam chamber a stand element to support the beam chamber.

In some embodiments, the present invention may include a kit having one or more apparatuses or systems disclosed herein. In some embodiments, a kit is provided comprising one or more components selected from the group consisting of a dry firing training target system, a laser emitting element, a target apparatus, a template element, a stand element, and a mechanical fastener.

It is to be understood that both the foregoing general description and the following detailed description are examples and explanatory and are not restrictive of the embodiments as claimed. It should be understood that the various embodiments are not limited to the arrangements and instrumentality shown in the drawings. It should also be understood that the embodiments may be combined, or that other embodiments may be utilized and that structural changes, unless so claimed, may be made without departing from the scope of the various embodiments. The following detailed description is, therefore, not to be taken in a limiting sense.

BRIEF DESCRIPTION OF THE SEVERAL VIEWS OF THE DRAWINGS

Example embodiments will be described and explained with additional specificity and detail through the use of the accompanying drawings in which.

DESCRIPTION OF EMBODIMENTS

As discussed above, the present disclosure relates generally to apparatuses, systems, and methods for dry fire training. In some embodiments, a lightweight, inexpensive target apparatus may be configured to brightly illuminate in response to a laser beam strike from a firearm. In some embodiments, when the laser beam strikes the apparatus, light energy from the laser beam may be distributed horizontally across a beam splitter lens and broken into hundreds of smaller beams, which may be reflected into a beam chamber. In some embodiments, a beam diffuser element within the chamber may break down the beams still further. In some embodiments, these small beams may be reflected back to the beam splitter lens at random angles and trajectories, such that the incoming beam energy may be dissipated over the surface of the beam splitter lens. In this manner, in some embodiments, the target apparatus may be brightly illuminated to indicate a laser beam hit without requiring batteries or another power source.

Figure 1:
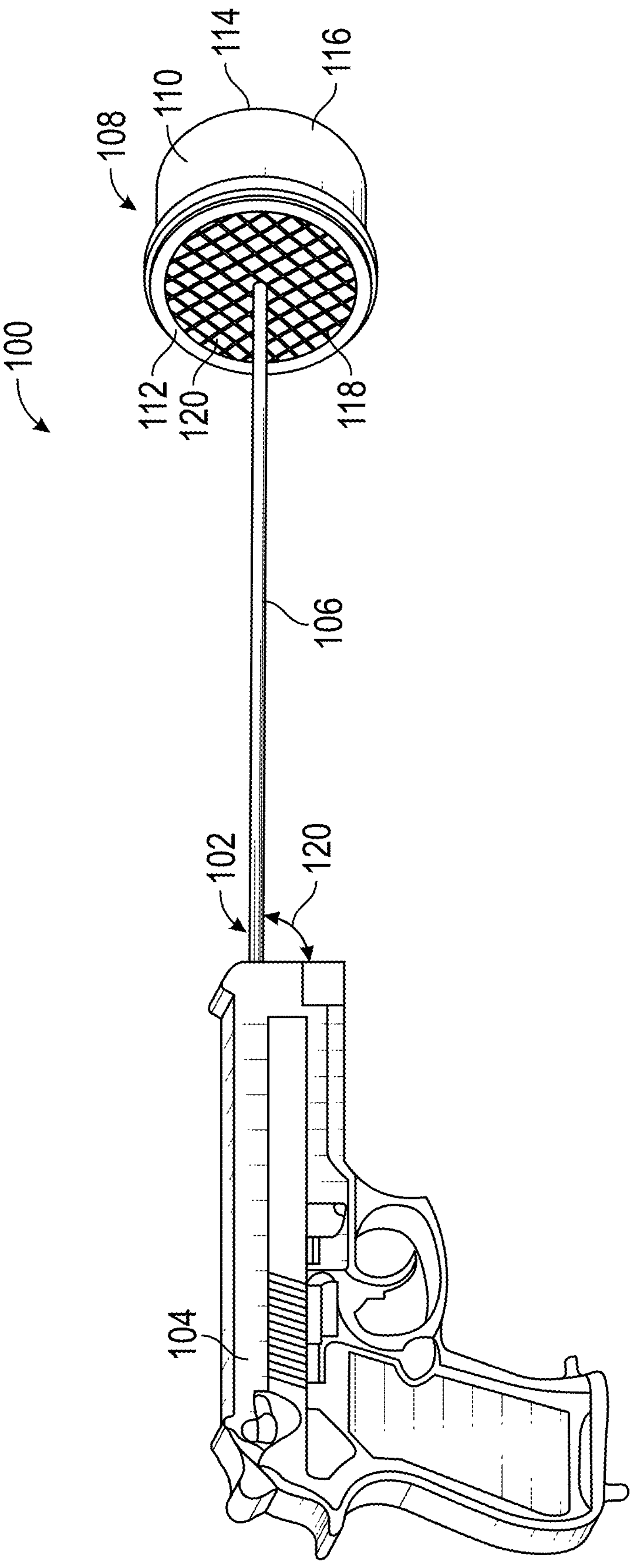
FIG. 1 is a side perspective view of an example dry fire training system including an example dry fire training target apparatus in accordance with some embodiments.

Referring now to FIG. 1, in some embodiments, a dry fire training target system 100 may include a firearm 104 having a laser emitting element 102 coupled thereto. For example, in some embodiments, the laser emitting element 102 may include a laser cartridge or laser platform configured to couple to an existing firearm 104 such that the dry fire training target system 100 may enable a user to train with his or her own weapon. In some embodiments, the laser emitting element 102 may be configured to emit a laser pulse 106 in response to a trigger pull or other actuation of the firearm 104. In other embodiments, the laser emitting element 102 may be integrated into a practice firearm 104. In some embodiments, the practice firearm 104 may include, for example, a practice pistol or rifle configured to fire a laser pulse 106 on trigger pull.

In any case, the laser emitting element 102 may increase a user's speed and accuracy by enabling the user to visibly aim and fire during practice. In some embodiments, the laser emitting element 102 may be continuously "ON", thereby enabling the user to practice bringing the firearm 104 from a safe-high or safe-low position and acquiring the target as quickly as possible. In some embodiments, the laser pulse 106 may include a trajectory 120 simulating a trajectory 120 of standard ammunition fired from the firearm 104 under the same or similar conditions. In some embodiments, the laser pulse 106 beam may be brightly colored, such as green or red, to facilitate visibility of the laser pulse 106 upon actuation of the firearm 104.

In some embodiments, the dry fire training system 100 may further include a target apparatus 108 configured to illuminate in response to a laser pulse 106 strike. In some embodiments, the target apparatus 108 may be configured to illuminate in response to the laser pulse 106 striking at least a portion of the target apparatus 108. In some embodiments, the target apparatus 108 may not require batteries or another power source.

In some embodiments, the target apparatus 108 may include a beam chamber 110 forming an enclosure to receive and enclose a laser pulse 106 strike from the laser emitting element 102. In some embodiments, the beam chamber 110 may be formed of aluminum, aluminum alloy, steel, plastic, a composite thereof, or any other suitable durable material.

In some embodiments, the beam chamber 110 may include a receiving side 112 and a reflecting side 114 opposite the receiving side 112. In some embodiments, the beam chamber 110 may include at least one sidewall 116 extending between the receiving side 112 and the reflecting side 114. In some embodiments, the beam chamber 110 may be formed as a cylinder, a circle, a box, a rectangle, a triangle, or any other suitable regular or irregular shape. In some embodiments, the beam chamber 110 may be formed to resemble a human, an animal, a composite shape, or other suitable shape or form.

Figure 2:
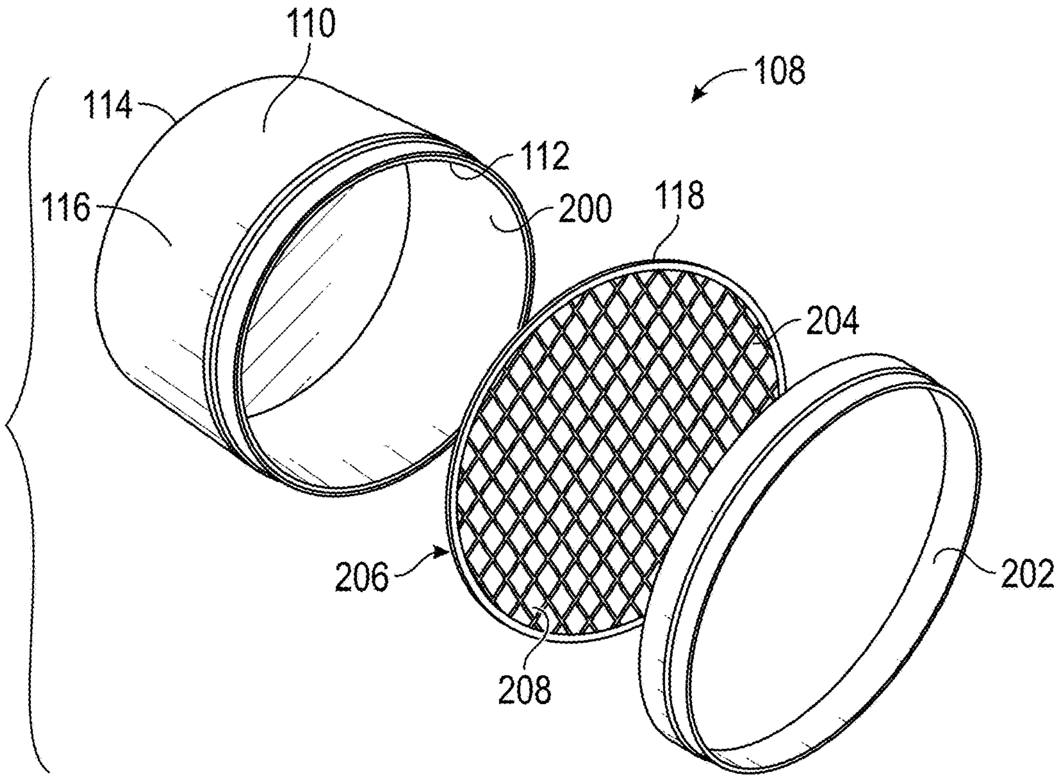
FIG. 2 is an exploded perspective view of the dry fire training target apparatus of FIG. 1.

In some embodiments, the receiving side 112 of the beam chamber 110 may include a beam splitter lens 118 configured to receive at least a portion of the laser pulse 106 beam therethrough. In some embodiments, the beam splitter lens 118 may be coupled to the receiving side 112 by a mechanical device or mechanism, a magnet, a press fit, an adhesive, or any other suitable means. In some embodiments, for example, the beam splitter lens 118 may be coupled to the receiving side 112 via a coupling element 202. As shown in FIG. 2, in some embodiments a coupling element 202 may include a threaded ring having threads to engage grooves in the receiving side 112 of the beam chamber 110 for a mechanical fit.

In some embodiments, the beam splitter lens 118 may include a shape corresponding to the receiving side 112 of the beam chamber 110. In some embodiments, the beam splitter lens 118 may include a size corresponding to the receiving side 112. In other embodiments, the beam splitter lens 118 may include any suitable size and shape.

In some embodiments, the beam chamber 110 may include a depth selected such that the beam splitter lens 118 provides a bright illuminating effect in response to a laser pulse 106 strike. In some embodiments, the depth of the beam chamber 110 may be substantially shallow to create an effect of illuminating a more localized section of the beam splitter lens 118. For example, in some embodiments, the beam chamber 110 may include a depth that is 75% to 80% of a diameter of the beam splitter lens 118. In this manner, in some embodiments, the beam splitter lens 118 may illuminate a specific point or small area more brightly than a surrounding area of the beam splitter lens 118 to precisely indicate a location of the laser pulse 106 strike.

In some embodiments, the beam splitter lens 118 may include a front surface 208 and a back surface 206. In some embodiments, the front surface 208 may correspond to the receiving side 112 of the beam chamber 110. In some embodiments, the back surface 206 may be disposed opposite of the front surface 208 such that the back surface 206 faces into an interior of the beam chamber 110. In some embodiments, the back surface 206 may be smooth or flat. In some embodiments, the beam splitter lens 118 may include a rigid material that is translucent or transparent such that the beam splitter lens 118 is configured to receive a laser pulse 106 therethrough. In some embodiments, the material forming the beam splitter lens 118 may include a color, such as red, configured to brightly illuminate in response to a laser pulse 106 strike.

In some embodiments, the beam splitter lens 118 may include multiple colors arranged such that illumination of one color indicates a more precise hit relative to illumination of another color. Similarly, in some embodiments, the beam splitter lens 118 may include multiple colors, where each color is pre-defined to indicate a certain attribute of a laser pulse 106 strike.

In some embodiments, the front surface 208 of the beam splitter lens 118 may include an array of beam splitting structures 204 configured to distribute the laser pulse 106 or beam horizontally across the beam splitter lens 118. In other words, in some embodiments, the laser pulse 106 or beam may enter the beam chamber 110 through the front surface 208 of the beam splitter lens 118. When the laser pulse 106 or beam hits the front surface 208, in some embodiments, the array of beam splitting structures 204 may break up the laser pulse 106 into hundreds of smaller beams that may be reflected through the beam splitter lens 118 into the interior of the beam chamber 110.

Referring now to FIG. 2, in some embodiments, a beam diffuser element 200 may be coupled to or integrated with the reflecting side 114 and/or sidewall 116 of the beam chamber 110. For example, in some embodiments, the beam diffuser element 200 may be a separate element that may be inserted into the beam chamber 110. In some embodiments, the beam diffuser element 200 may be removably or fixedly coupled to the beam chamber 110 by way of an adhesive, a press fit, or any other suitable means. In some embodiments, the beam diffuser element 200 may be molded directly as part of the interior surface of the beam chamber 110.

Figure 3:
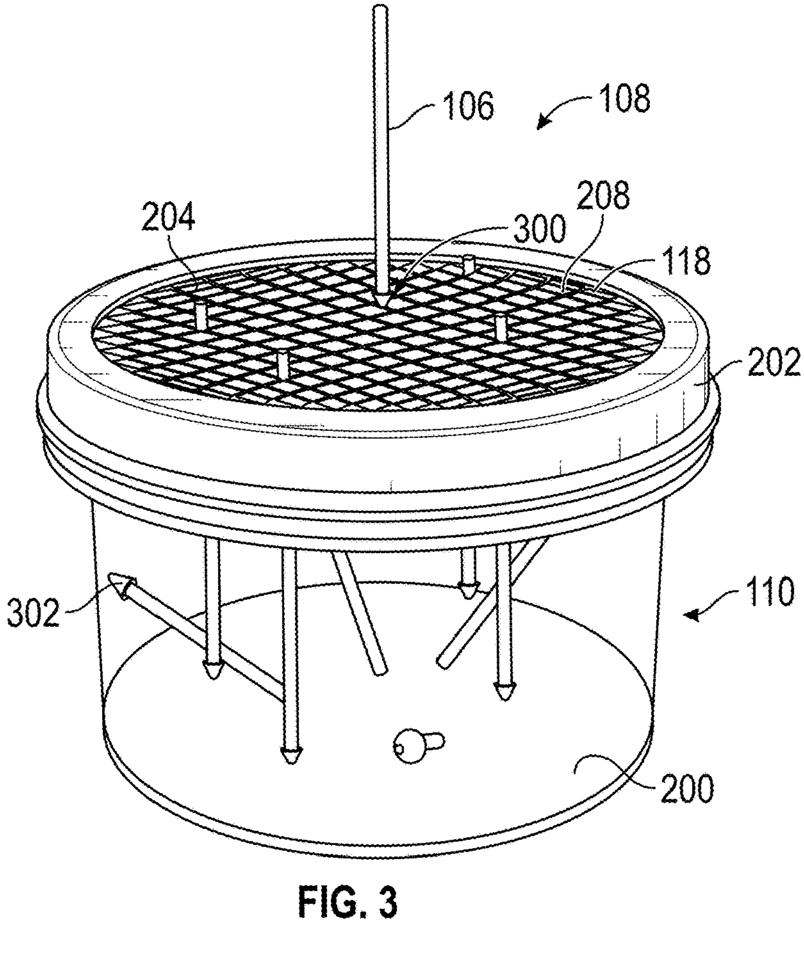
FIG. 3 is a perspective view of the dry fire training target apparatus of FIG. 1.

Referring now to FIG. 3, in some embodiments, the beam diffuser element 200 may be configured to diffuse or iteratively reflect the laser pulse 106 beam (or smaller portions thereof created by the array of beam splitting structures 204) at random angles and trajectories around the beam chamber 110. In some embodiments, the laser pulse 106 beam or smaller beams may eventually be reflected back to the back surface 206 of the beam splitter lens 118. In this manner, in some embodiments, the target apparatus 108 may illuminate in response to a laser pulse 106 strike.

For example, in some embodiments, the laser pulse 106 beam may enter the beam chamber 110 through the beam splitter lens 118 at a first trajectory 300. In some embodiments, the beam diffuser element 200 may then reflect the laser pulse 106 beam, or portion thereof, at a second trajectory 302. In some embodiments, this process may repeat until the light energy from the laser pulse 106 beam is returned to the beam splitter lens 118, causing it to brightly illuminate.

In some embodiments, the beam diffuser element 200 may include a concave or convex shape such that reflection of the laser pulse 106 towards the back surface 206 of the beam splitter lens 118 produces a more localized illumination spot compared to illumination produced by a beam diffuser element 200 that is flat or mostly flat.

Figure 4:
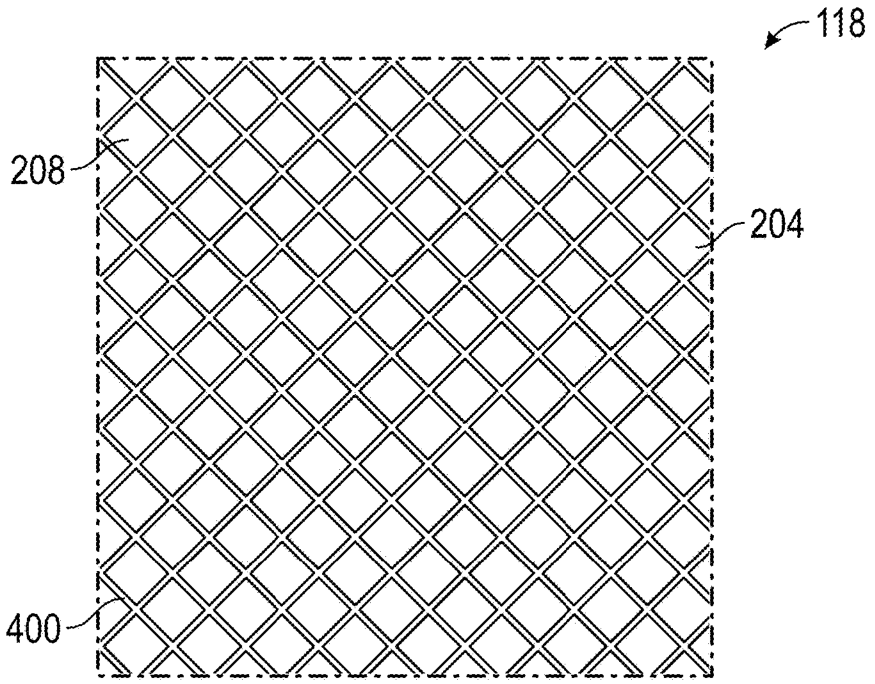
FIG. 4 is an enlarged front view of an example beam splitter lens of an example dry fire training target apparatus according to some embodiments.

Referring now to FIG. 4, in some embodiments, the array of beam splitting structures 204 may include an array of evenly-distributed, small, pyramid-shaped structures 400. Of course, in some embodiments, the array of beam splitting structures 204 may include structures having any geometric or other suitable shape.

Figure 5:
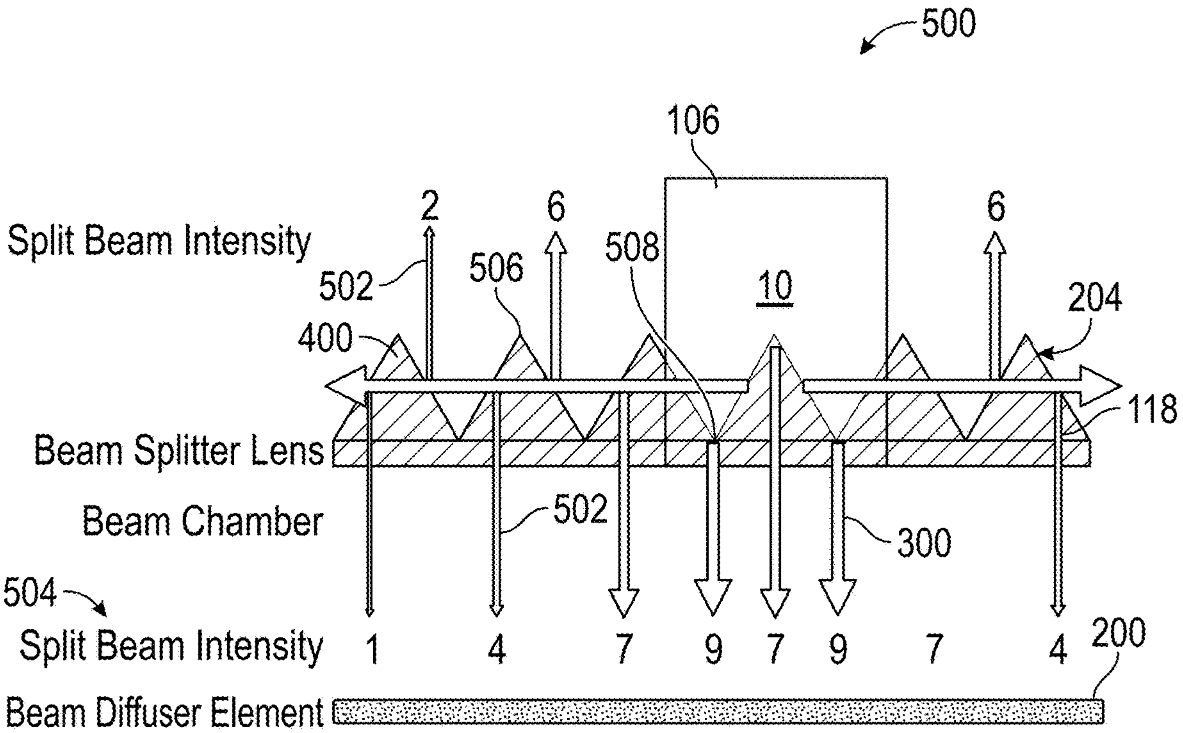
FIG. 5 is a graph illustrating a beam splitting process performed by an example beam splitter lens according to some embodiments.

The graph 500 of FIG. 5 illustrates distribution of a laser pulse 106 beam across an array of beam splitting structures 204 in accordance with some embodiments. As shown, in some embodiments, the laser pulse 106 beam may strike the beam splitter lens 118 at a first trajectory 300. In some embodiments, the location of the strike may correspond to one or more beam splitting structures 400 of the array of beam splitting structures 204.

In some embodiments, some of the light energy 502 of the laser pulse 106 beam may pass directly through the beam splitter lens 118 at trough 508 and/or peak 506 points. In some embodiments, at least a portion of the laser pulse 106 beam may be reflected at a ninety degree (90°) angle by some of the beam splitting structures 400. In some embodiments, some of this reflected light energy 502 may pass through adjacent beam splitting structures 400 such that the light energy 502 is dissipated to illuminate the beam splitter lens 118. In some embodiments, at least a portion of the light energy 502 may be reflected down into an interior of the beam chamber 110 to the beam diffuser element 200.

Figure 6:
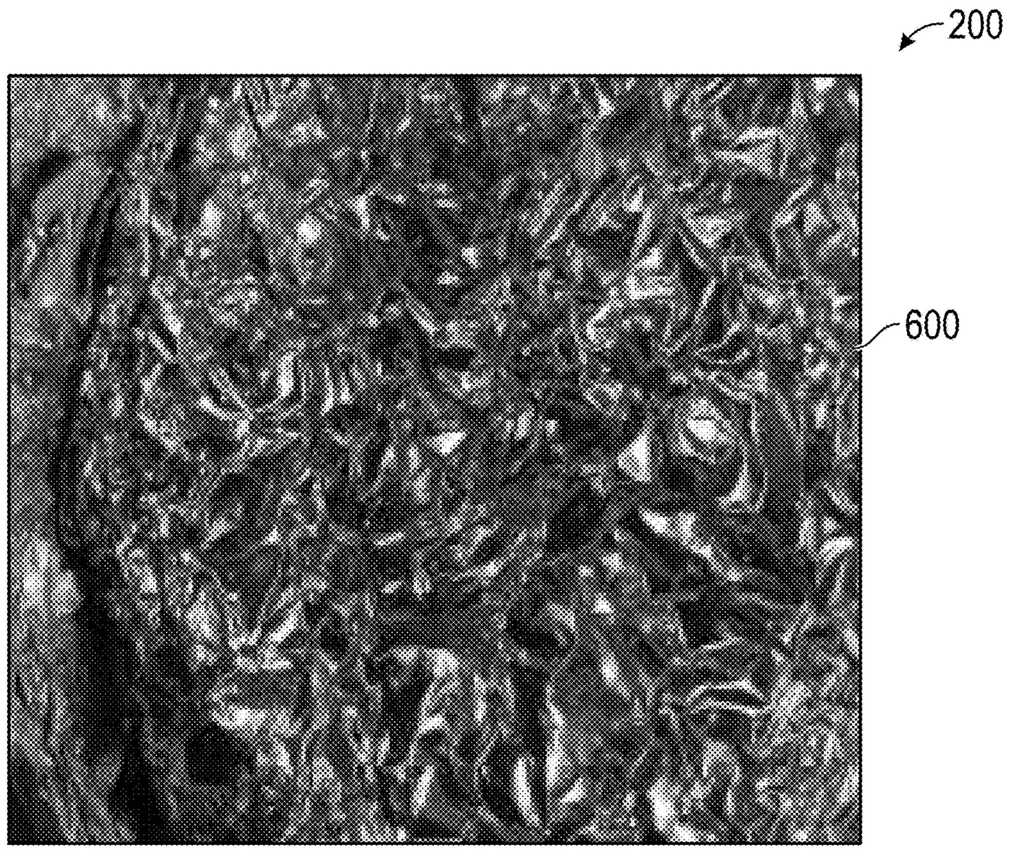
FIG. 6 is an enlarged perspective view of an example beam diffuser element according to some embodiments.

Referring now to FIG. 6, in some embodiments, the beam diffuser element 200 may include a highly reflective material such as aluminum foil or other suitable material. In some embodiments, the beam diffuser element 200 may include an irregular or random, non-smooth surface texture 600 such that there are no consistent angles from which the laser pulse 106 beams may reflect. For example, in some embodiments, the irregular surface texture 600 of the beam diffuser element 200 may resemble crumpled aluminum foil. In this manner, in some embodiments, the incoming laser pulse 106 beams may be effectively reflected by the irregular surface texture 600 in random directions within the beam chamber 110.

Figure 7:
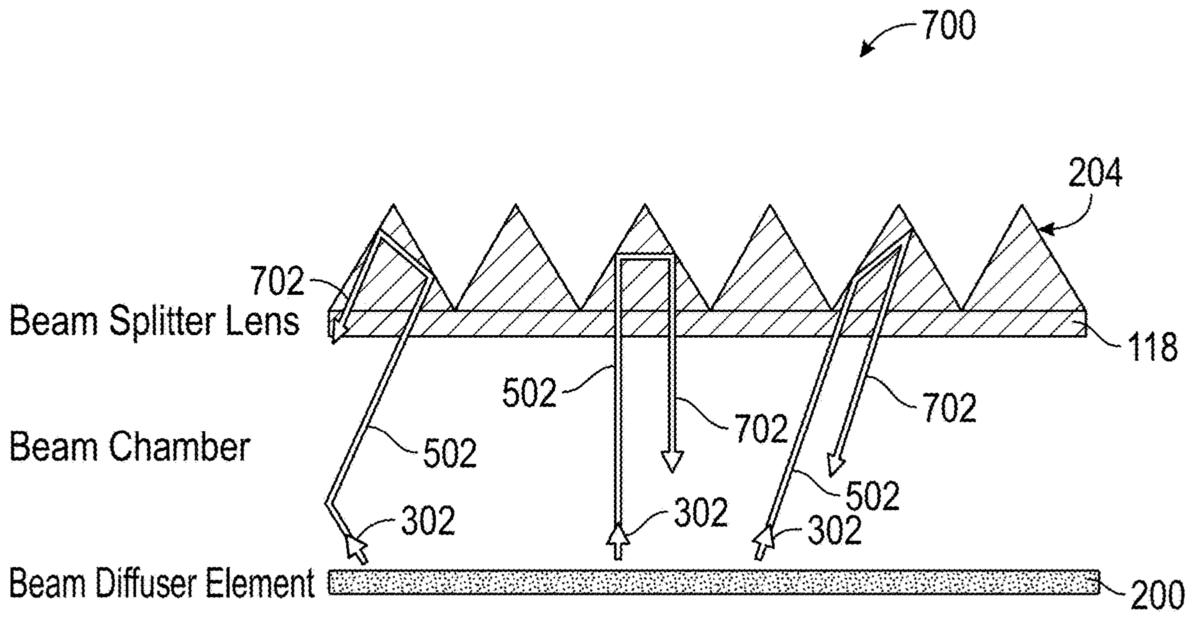
FIG. 7 is a graph illustrating a beam diffusing process performed by an example beam diffuser element according to some embodiments.

Referring now to FIG. 7, in some embodiments, a beam diffuser element 200 may be coupled to or integrated with the reflecting side 114 and/or the sidewall 116 to scatter the light energy around the beam chamber 110. In some embodiments, the beam diffuser element 200 may be configured to diffuse the laser pulse 106 beam around the beam chamber 110 at random angles and trajectories 702 until it returns to the beam splitter lens 118.

For example, the graph 700 of FIG. 7 illustrates light energy 502 that may be received into the beam chamber 110 at a first trajectory 300 and reflected off of the beam diffuser element 200 at a second trajectory 302. In some embodiments, the combination of the beam diffuser element 200 and the beam splitting structures 204 may scatter the light energy 502 at random angles and trajectories 702 around the beam chamber 110.

For example, in some embodiments, light energy 502 striking the array of beam splitting structures 204 after striking the beam diffuser element 200 may dissipate some of its energy, thereby illuminating the beam splitter lens 118. In some embodiments, some of this light energy 502 may be reflected back into the beam chamber 110, where it may again be scattered by the beam diffuser element 200 until it again strikes the beam splitter lens 118 and dissipates more energy. In some embodiments, this process may effectively distribute the energy of the laser pulse 106 beam across the beam splitter lens 118, thereby causing a bright illumination effect to indicate a laser hit.

Figure 8A:
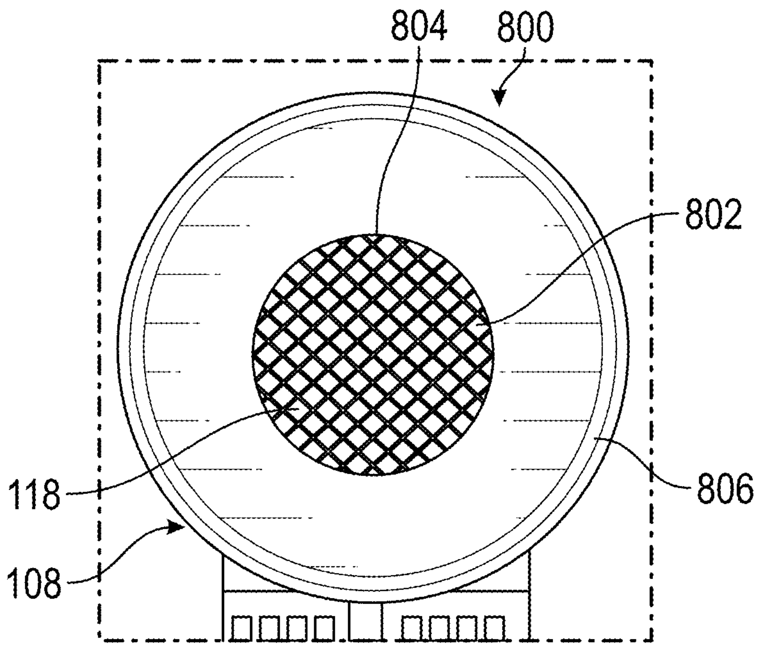
FIG. 8A is a front view of an example template element disposed over an example target apparatus according to some embodiments.
Figure 8B:
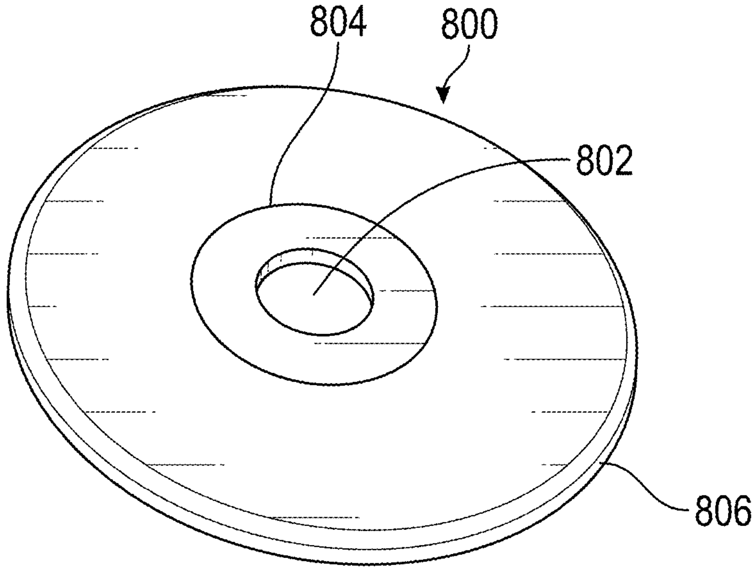
FIG. 8B is a perspective view of another example template element according to some embodiments.

Referring now to FIGS. 8A and 8B, in some embodiments, the dry fire training system 100 may include a template element 800 configured to couple to the target apparatus 108. In some embodiments, the template element 800 may be substantially planar and may be configured to couple to the front surface 208 of the beam splitter lens 118 and/or otherwise conform to the target apparatus 108. In some embodiments, the template element 800 may be substantially flexible. In some embodiments, the template element 800 may be disposable. In any case, in some embodiments, the template element 800 may selectively reduce an exposed area 802 of the beam splitter lens 118 and/or target apparatus 108.

For example, in some embodiments, the template element 800 may include a shape and/or size substantially corresponding to the shape and/or size of the beam splitter lens 118. In some embodiments, the template element 800 may include a circumference/perimeter 806 that substantially matches the outer edge of the beam splitter lens 118, and a radius 804 or width that is less than that of the beam splitter lens 118. In this manner, in some embodiments, the template element 800 may resemble a frame surrounding an aperture or void creating an exposed area 802 of the beam splitter lens 118 or target apparatus 108.

In some embodiments, the template element 800 may be selectively attached to the beam splitter lens 118 or target apparatus 108 via an adhesive, a magnet, clips, or any other suitable means. In this manner, the template element 800 may be easily varied and/or replaced to challenge the user and rapidly improve the user's skills.

In some embodiments, various template elements 800 may be provided which may vary in the size and/or location of the exposed area 802. In some embodiments, for example, the template element 800 may be selected such that the exposed area 802 may be any of 3 inches, 2 inches, or 1 inch in diameter. In some embodiments, a template element 800 having an exposed area 802 of one size may be easily replaced by another template element 800 having an exposed area 802 of a different size. Similarly, in some embodiments, a template element 800 having an exposed area 802 in one location relative to the beam splitter lens 118 may be replaced by another template element 800 having an exposed area 802 in a different location relative to the beam splitter lens 118.

In some embodiments, the template element 800 may be adjustable to selectively vary the size and/or location of the exposed area 802. For example, the template element 800 may include an adjustment mechanism, such as a lever or other suitable adjustment mechanism, to selectively expand or contract the diameter or area of the exposed area 802 as desired.

In some embodiments, the template element 800 may comprise a filter substantially or entirely covering the beam splitter lens 118, or substantially or entirely covering an exposed area 802 of the beam splitter lens 118 and/or target apparatus 108, wherein the filter comprises an opacity configured to reflect a first portion of the laser pulse, and permit a second or remaining portion of the laser pulse to pass through the filter and contact the beam diffuser, wherein the reflected first portion of the laser pulse is detected by a tracking software program via a camera of a smart device (i.e., a smartphone or tablet), and wherein the second portion is scattered and detected visually by the user. In some embodiments, the opacity of template element 800 is uniform throughout an entirety of the template element. In other embodiments, a base or body of the template element 800 is optically clear, wherein an opacity is added to the base or body by adhering an opacity layer to an interior or exterior facing surface of the base or body. In some embodiments, an opacity of template element 800 comprises a texture applied to an interior or exterior facing surface of the base or body. In some embodiments, an opacity layer of template element 800 may be selectively removed. In some embodiments, an opacity layer of template element 800 is permanently secured to the base or body. In some embodiments, template element 800 comprises a glass or polymer material having an opacity compatible for use with a tracking software program, as described herein.

Figure 9:
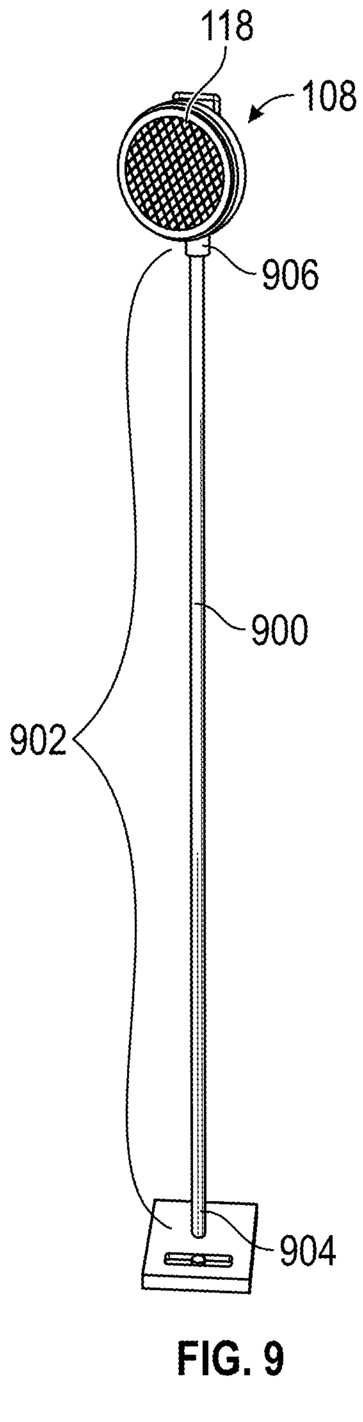
FIG. 9 is a perspective view of an example stand element supporting an example target apparatus according to some embodiments.

Referring now to FIG. 9, in some embodiments, the dry fire training system 100 may include a stand element 900 to support the target apparatus 108. In some embodiments, the stand element 900 may include a base element 904 having an attachment element 906 to couple the target apparatus 108 to the stand element 900. In some embodiments, the attachment element 906 may be magnetic or may include a mechanical fastener or another suitable attachment mechanism to selectively attach the target apparatus 108 thereto.

In some embodiments, a height 902 and/or orientation of the stand element 900 may be adjustable to vary a position of the target apparatus 108 as desired. In this manner, in some embodiments, a location or position of the target apparatus 108 may be varied to provide a more realistic and comprehensive dry fire training system 100. In some embodiments, multiple target apparatuses 108 may be placed at various distances around a practice area for realistic dry fire training and target practice.

In some embodiments, a kit is provided having one or more apparatuses or systems disclosed herein. In some embodiments, a kit comprises a dry firing training target system comprising a target apparatus. In some embodiments, a kit further comprises a template element or a set of template elements. In some embodiments, a kit further comprises one or more stand elements. In some embodiments, a kit further comprises a mechanical fastener. In some embodiments, a kit further comprises a laser emitting element. In some embodiments, a kit further comprises instructions for using various components of the kit. In some embodiments, a kit further comprises a training program for using various components of the kit.

All examples and conditional language recited herein are intended for pedagogical objects to aid the reader in understanding the invention and the concepts contributed by the inventor to furthering the art, and are to be construed as being without limitation to such specifically recited examples and conditions. Although various embodiments have been described in detail, it should be understood that the various changes, substitutions, and alterations could be made hereto without departing from the spirit and scope of the embodiments.

The invention claimed is:

1. A dry fire training target apparatus, comprising:

a beam chamber comprising:

a receiving side;

a reflecting side disposed opposite the receiving side; and at least one sidewall extending between the receiving side and the reflecting side, wherein the receiving side comprises an exterior surface that is exterior to the beam chamber and an interior surface that is interior to the beam chamber;

a beam splitter lens coupled to the receiving side, the beam splitter lens configured to receive at least a portion of a laser pulse from the exterior surface and pass it therethrough, the laser pulse comprising a first trajectory; and a beam diffuser element coupled to at least one of the reflecting side and the sidewall, the beam diffuser element configured to diffuse the laser pulse around the beam chamber and reflect the laser pulse at a second trajectory through the beam splitter lens from the interior surface to illuminate the beam splitter lens and the exterior surface.

2. The apparatus of claim 1, wherein the beam chamber comprises a rigid material selected from the group consisting of aluminum, aluminum alloy, steel, plastic, and a composite thereof.

3. The apparatus of claim 1, wherein the beam splitter lens comprises one of a translucent and a transparent material.

4. The apparatus of claim 1, wherein the beam splitter lens comprises an array of beam splitting structures.

5. The apparatus of claim 4, wherein each of the beam splitting structures of the array comprises a pyramid shape.

6. The apparatus of claim 4, wherein the beam splitter lens comprises a flat surface disposed opposite the array.

7. The apparatus of claim 6, wherein the beam diffuser element iteratively reflects the laser pulse at random angles to distribute the laser pulse across the flat surface.

8. The apparatus of claim 1, wherein the beam diffuser element comprises a highly reflective material.

9. The apparatus of claim 8, wherein the highly reflective material comprises an irregular surface texture.

10. A dry fire training system, comprising:

a laser emitting element configured to couple to a firearm, wherein the laser emitting element emits a laser pulse upon actuation of the firearm; and a target apparatus configured to illuminate in response to the laser pulse hitting at least a portion of the target apparatus, wherein the target apparatus comprises:

a beam chamber comprising:

a receiving side;

a reflecting side disposed opposite the receiving side; and at least one sidewall extending between the receiving side and the reflecting side, wherein the receiving side comprises an exterior surface that is exterior to the beam chamber and an interior surface that is interior to the beam chamber;

a beam splitter lens coupled to the receiving side, the beam splitter lens configured to receive at least a portion of a laser pulse from the exterior surface and pass it therethrough, the laser pulse comprising a first trajectory; and a beam diffuser element coupled to at least one of the reflecting side and the sidewall, the beam diffuser element configured to diffuse the laser pulse around the beam chamber and reflect the laser pulse at a second trajectory through the beam splitter lens from the interior surface to illuminate the beam splitter lens and the exterior surface.

11. The system of claim 10, further comprising a template element configured to couple to the target apparatus to selectively reduce an exposed area of the beam splitter lens.

12. The system of claim 11, wherein the template element is adjustable to at least one of enlarge and reduce the exposed area.

13. The system of claim 10, further comprising a stand element configured to selectively support the target apparatus.

14. The system of claim 13, wherein the stand element is adjustable to selectively vary a height of the target apparatus.

15. The system of claim 10, wherein the beam splitter lens comprises an array of beam splitting structures.

16. The system of claim 15, wherein each of the beam splitting structures of the array comprises a pyramid shape.

17. The system of claim 10, wherein the beam diffuser element comprises a highly reflective material having an irregular surface texture.

18. A method of making a target apparatus for dry fire training, comprising:

providing a beam chamber comprising:

a receiving side;

a reflecting side disposed opposite the receiving side; and at least one sidewall extending between the receiving side and the reflecting side, wherein the receiving side comprises an exterior surface that is exterior to the beam chamber and an interior surface that is interior to the beam chamber;

coupling to the receiving side a beam splitter lens configured to receive at least a portion of a laser pulse comprising a first trajectory and pass it through the beam splitter lens from the exterior surface of the receiving side to the interior surface of the receiving side;

coupling a beam diffuser element to an interior surface of at least one of the reflecting side and the at least one sidewall, wherein the beam diffuser element is configured to diffuse the laser pulse around an interior volume of the beam chamber and reflect the laser pulse at a second trajectory through the beam splitter lens from the interior surface to illuminate the beam splitter lens and the exterior surface.

19. The method of claim 18, further comprising selectively coupling to the beam chamber a template element to reduce an exposed area of the beam splitter lens.

20. The method of claim 18, further comprising selectively coupling to the beam chamber a stand element to support the beam chamber.

* * * * *